Dec. 11, 1928.                                                                            1,694,868
A. F. SAWYER
MOTOR SUPPORT
Filed Feb. 12, 1927
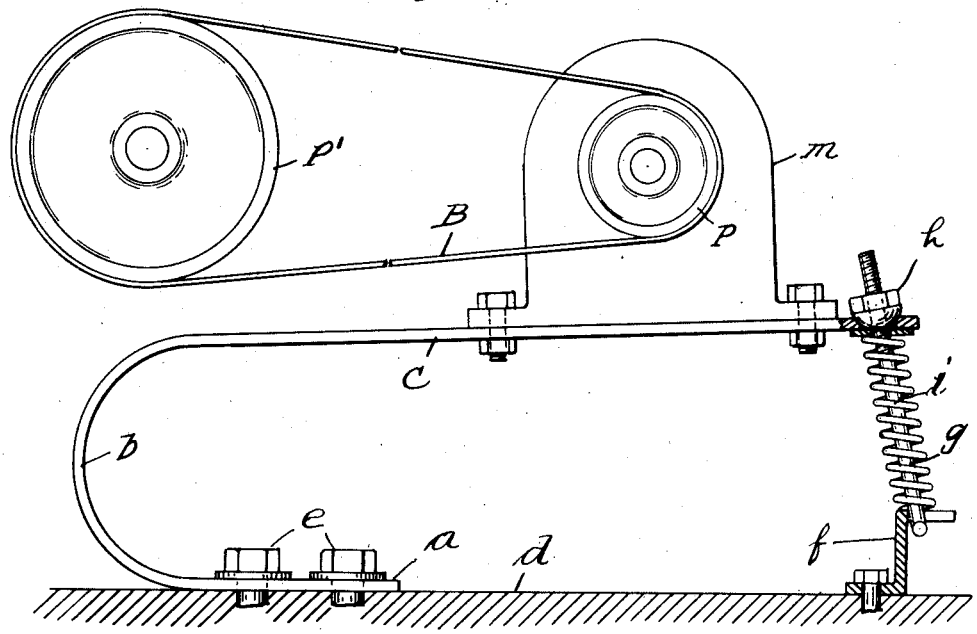
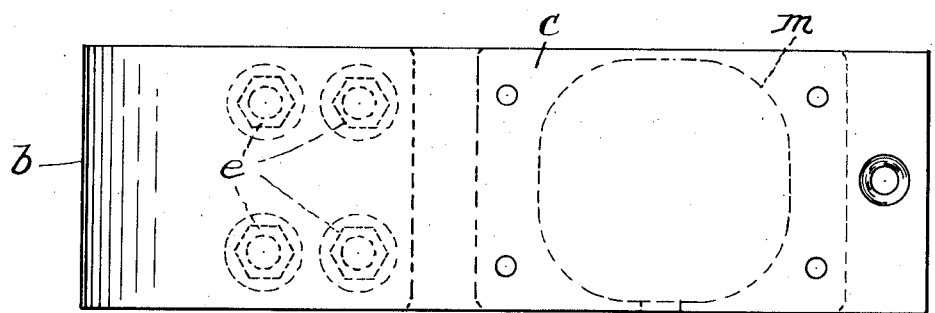
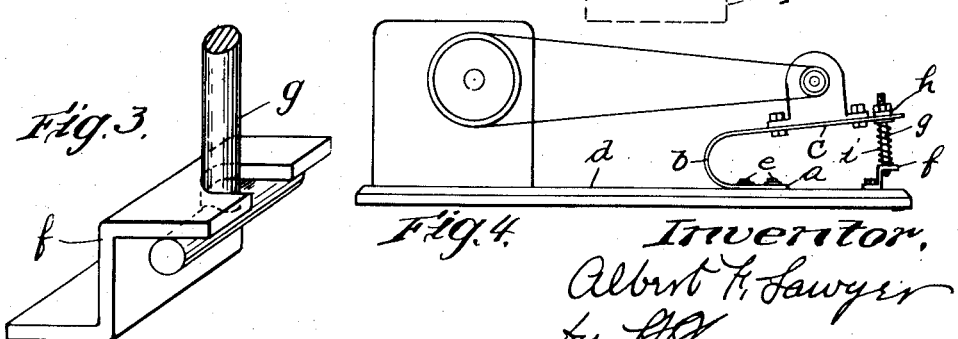

Patented Dec. 11, 1928.

1,694,868

UNITED STATES PATENT OFFICE.

ALBERT F. SAWYER, OF HAVERHILL, MASSACHUSETTS, ASSIGNOR TO IRVING L. KEITH, OF HAVERHILL, MASSACHUSETTS.

MOTOR SUPPORT.

Application filed February 12, 1927. Serial No. 167,661.

This invention relates to supports for small electric motors particularly adapted for use in positions where it is desired to take up the vibrations due to the rapidly rotating armature, as for example in domestic refrigeration machines where the motor and compressor pump are either located in a compartment of the refrigerator or adjacent thereto, so that noise and vibration are likely to be objectionable.

The effect of the vibrations from a rotary armature may be resolved into vertical and horizontal components and, while vertically yieldable motor supports have been employed, yet they do not absorb the horizontal components of the motor vibrations. When the motor is employed to drive a machine, as a gas pump, which is mounted on the same base as the motor, as is common practice in domestic refrigeration machines, and it is desired to employ a belt drive therebetween, a relative adjustment of one of the machines with relation to the other is necessary to adjust the tightness of the belt accurately.

The objects of my invention are to provide a form of motor support which is adapted to absorb both the horizontal and vertical components of the vibrations of the motor and which is also adapted for ready and accurate adjustment to vary the tightness of a belt from the motor to the machine which is driven thereby. Also to provide a support which is of simple construction so that it is inexpensive to manufacture, and may be readily applied to a base on which the motor and pump of a refrigerating machine are to be mounted.

I accomplish these objects by means of the construction hereinafter described and illustrated in the accompanying drawings in which:

Fig. 1 is a side elevation of a preferred embodiment of my invention.

Fig. 2 is a plan view thereof.

Fig. 3 is a detail view of a connecting bracket which may be employed.

Fig. 4 is a side elevation of the complete apparatus.

As shown in the drawing, a continuous flat strip of resilient sheet metal of approximately uniform width is provided which comprises a flat base portion $a$, a semi-cylindrically shaped intermediate portion $b$ and a supporting portion $c$, which extends, preferably, but not necessarily, in slightly divergent relation to the base portion $a$. Said base portion is firmly secured to a horizontal base, or platform $d$, by bolts $e$, with its side opposite the supporting portion resting thereon, so that said portion $c$ extends at a slight upward inclination over the portion $a$ and the ends of the curved portion $b$ are directly over each other.

A motor $m$ is bolted securely to the upper side of the portion $c$ near its end with its shaft in transversal relation thereto, the pulley P on the shaft thereon having a belt B passing about the same and about the pulley P' on the main shaft of a machine which is mounted on the platform $d$ at the opposite side of the curved portion $b$ from the motor, so that the belt will extend approximately horizontally between the pulleys, as indicated in Fig. 4. The width of the strip will correspond approximately to the length of the motor base which is secured thereon, as shown in Fig. 2.

As the sheet material of which the support is made is somewhat resilient, its semi-cylindrically curved portion is particularly so, and will permit the supporting portion $c$ to be swung towards the base portion against the resilient action thereof, the tension of said curved portion with relation to the weight and position of the motor being such that it will support the motor in a position approximately as indicated in Figs. 1 and 4 and will swing readily either up or down from this position. The curved construction of the resilient portion $b$ also permits a longitudinal, horizontal movement of the supporting portion $c$, so that, with this construction, the motor is so supported that both the vertical and horizontal components of its vibrations will be resiliently resisted in all directions. It is to be further noted that some of the tendency to vibrate horizontally will be longitudinally of the motor shaft, which is set in transverse relation to the supporting portion $c$, and that there will be some thrust in this direction, partly due to the pull of the belt on the shaft. With the above described construction and arrangement, any tendency to cause lateral or horizontal swinging of the supporting portion $c$ will have a torsional effect on the curved portion $b$, which will yieldingly resist this tendency.

In order that the support may be employed as a belt tightener, a bracket $f$, having a slot therein, is secured to the platform $d$, beneath the free and end portion of the portion $c$, and a T-headed bolt $g$ is inserted in said slot and engaged with said bracket, so as to form a pivotal connection therewith. The opposite end portion of the bolt is extended thru an aperture in the support and a nut $h$, having a rounded under side, is threaded thereon and engaged with the upper side of the support $c$. A coil spring $i$ is preferably arranged on the bolt and interposed between the under side of the support and top side of the bracket, the arrangement being such that the bolt is held in a position somewhat inclined from the bracket towards the curved portion of the support, so that, when the nut is screwed down on the bolt, it will not only act to draw, or swing the supporting portion $c$ downward, but will also act to draw it longitudinally away from the pully P′. Consequently, when portion $c$ is drawn down, by screwing down the nut $h$, the motor will be moved away from the machine which is driven thereby, so that the belt drive therebetween will be tightened, both the downward and horizontal movement of the motor thereby being effective in increasing the distance between the driving and the driven shafts.

The spring $i$, while arranged in a position in which it will supplement the action of the curved portion $b$ in supporting the motor, also acts to hold the supporting portion $c$ firmly against the nut $h$, so as to prevent rattling between these points, which might be caused by the vertical vibrations of the motor.

While the resilient supporting plate is primarily advantageous in acting so to support the motor that vibrations in all directions are absorbed thereby, the means combined therewith which enable the tension of the belt to be readily and accurately adjusted is a simple construction which adds but slightly to the cost of manufacture.

I claim:

1. In combination with a base having a pulley mounted thereon, a motor having a driving belt extending to said pulley, a support for said motor comprising a base portion mounted on said base, a semi-circularly curved resilient portion connected thereto at one end and extending upwardly therefrom to a position in which its upper portion is approximately directly over its lower portion, and an elongated supporting portion for said motor, connected at one end to the upper end of said resilient portion and extending horizontally at the opposite side thereof from said pulley, and means for adjustably connecting the free end of said supporting portion to the base, to vary the distance between the pulley and the motor.

2. In combination with a base having a pulley mounted thereon, a motor having a driving belt extending to said pulley, a support for said motor comprising a base portion mounted on said base, a semi-circularly curved resilient portion connected thereto at one end and extending upwardly therefrom to a position in which its upper portion is approximately directly over its lower portion, and an elongated supporting portion for said motor, connected at one end to the upper end of said resilient portion and extending horizontally at the opposite side thereof from said pulley, and adjusting means connecting said base and the free end of said supporting means arranged to swing the latter downwardly and pull it longitudinally from said pulley.

3. In combination with a horizontal base having a pulley mounted thereon, a motor having a driving belt extending to said pulley, a support for said motor comprising a base portion secured horizontally on said base and having a reversely curved resilient portion extending from its end next the pulley and a supporting portion extending from the opposite end of said resilient portion from said base portion horizontally over the latter, said motor being mounted on said supporting portion and being resiliently supported thereby, and means for adjustably connecting said supporting portion at its free end to the base, to vary the position of the motor with relation to the pulley.

4. In combination with a horizontal base having a pulley mounted thereon, a motor having a driving belt extending to said pulley, a support for said motor comprising a base portion secured horizontally on said base and having a reversely curved resilient portion extending from its end next the pulley and a supporting portion extending from the opposite end of said resilient portion from said base portion horizontally over the latter, said motor being mounted on said supporting portion and being resiliently supported thereby, and means connected to said base and to the free end of said supporting portion to adjust the latter vertically and horizontally.

5. In combination with a horizontal base having a pulley mounted thereon, a motor having a driving belt extending to said pulley, a support for said motor comprising a base portion secured horizontally on said base and having a reversely curved resilient portion extending from its end next the pulley and a supporting portion extending from the opposite end of said resilient portion from said base portion horizontally over the latter, said motor being mounted on said supporting portion and being resiliently supported thereby, and means connecting said base and the free end of said supporting portion to vary the inclination of the latter.

6. In combination with a horizontal base having a pulley mounted thereon, a motor having a driving belt extending to said pulley, a support for said motor comprising a base portion secured horizontally on said base and having a reversely curved resilient portion extending from its end next the pulley and a supporting portion extending from the opposite end of said resilient portion from said base portion horizontally over the latter, said motor being mounted on said supporting portion and being resiliently supported thereby, and adjustable means connected to said base and to the free end of said supporting portion arranged to draw the latter downwardly and horizontally away from said pulley against the action of said resilient portion.

In testimony whereof, I have signed my name to this specification.

ALBERT F. SAWYER.